United States Patent
Karakawa et al.

(10) Patent No.: US 6,671,240 B2
(45) Date of Patent: Dec. 30, 2003

(54) DEFECTIVE REGION PROCESSING APPARATUS, DEFECTIVE REGION PROCESSING METHOD, AND INFORMATION STORAGE DEVICE

(75) Inventors: Yuji Karakawa, Kawasaki (JP); Shigenori Yanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 205 days.

(21) Appl. No.: 09/808,258

(22) Filed: Mar. 14, 2001

(65) Prior Publication Data

US 2002/0054553 A1 May 9, 2002

(30) Foreign Application Priority Data

Nov. 9, 2000 (JP) ........................................ 2000-342273

(51) Int. Cl.[7] ................................................ G11B 3/90
(52) U.S. Cl. .................................. 369/53.15; 369/47.14
(58) Field of Search ........................... 369/44.32, 47.14, 369/47.17, 53.12, 53.15, 53.32, 53.33, 53.35, 53.36, 53.42

(56) References Cited

U.S. PATENT DOCUMENTS 4,833,665 A * 5/1989 Tokumitsu et al. ...... 369/53.36
6,058,047 A * 5/2000 Kikuchi ...................... 365/200

FOREIGN PATENT DOCUMENTS

| JP | 57-53844 | 3/1982 |
| JP | 5-225643 | 9/1993 |
| JP | 6-302033 | 10/1994 |

* cited by examiner

Primary Examiner—Paul W. Huber
(74) Attorney, Agent, or Firm—Greer, Burns & Crain, Ltd.

(57) ABSTRACT

A defective sector is processed so that a mark can be normally read in a sector adjacent to a defective sector.

A recording state of a sector determined as a defective sector (step S102: Yes) is changed to another recording state in which a level of cross talk is low (step S103).

18 Claims, 9 Drawing Sheets

DEFECTIVE REGION PROCESSING APPARATUS, DEFECTIVE REGION PROCESSING METHOD, AND INFORMATION STORAGE DEVICE

BACKGROUND OF THE INVENTION (i) Field of the Invention

The present invention relates to a defective region processing apparatus and a defective region processing method for processing a defective region on an information storage medium including a plurality of regions, and an information storage device for recording information on the information storage medium.

(ii) Description of the Related Art

As a high-density information storage medium for recording/producing sound data or image data, an optical storage medium or magnetic storage medium are known. Spiral or concentric tracks are typically provided on such an information storage medium, and these tracks are divided into a plurality of regions which are generally called sectors. Information is stored by writing marks in these sectors by using a magnetic field or heat, and information is reproduced by reading the marks generated by the magnetic field or light.

A plurality of such sectors are provided on the information storage medium, and a defective sector may be generated during production or use of the information storage medium. An information storage device for recording information on an information storage medium or a formatting device for formatting an information storage medium is, therefore, provided with a function as a defective region processing device which executes a process for prohibiting use of such a defective sector or a process for registering a normal preliminary sector instead of such a defective sector.

With recent improvement in the computer technology, a data size or a quantity of sound data or image data to be used is increasing and enhancement of recording density of the information storage medium is eagerly desired. Miniaturization of the track pitch is demanded in order to greatly improve the recording density of the information storage medium.

As a technique for miniaturizing the track pitch, land and groove recording is proposed by which information is recorded on both flute-like grooves and protruding lands alternately provided on the storage medium.

Figure 1:
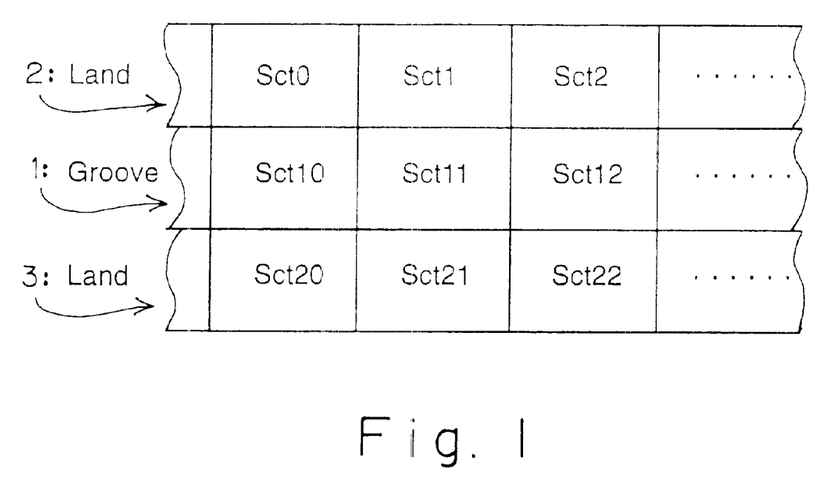
FIG. 1 is a view showing sectors on an information storage medium adopting land and groove recording.

FIG. 1 is a view showing sectors on an information storage medium adopting the land and groove recording.

FIG. 1 illustrates one groove 1 and two lands 2 and 3 sandwiching that groove. Both the groove 1 and the lands 2 and 3 are used as tracks, and a plurality of sectors are provided to each track. Numbers for differentiating the sectors are given to these multiple sectors. For example, the 10th sector Sct10, the 11th sector Sct11, the 12th sector Sct12, . . . are provided on the groove 1 depicted in this drawing, and the 0th sector Sct0, the first sector Sct1, the second sector Sct2, . . . , the 20th sector Sct20, the 21st sector Sct21, the 22nd sector Sct22, . . . are provided to the respective two lands 2 and 3 sandwiching the groove 1. That is, serial numbers are given to respective sectors provided in one track, and numbers given to a sector are different by 10 from those given to another sector adjacent to the former in a transverse direction of the tracks.

In this manner, both the grooves and the lands are used as tracks in the land and groove recording. The track pitch can be, therefore, simply reduced to approximately ½ as compared with a technique using only one of the grooves and the lands as tracks, and the recording density can be doubled if the linear recording density remains unchanged. Accordingly, the above-described technique is extremely important for realizing the high-density recording.

However, if the land and groove recording and the like is adopted to greatly miniaturize the track pitch, when reading a mark on a given track, cross talk caused due to a mark on a track adjacent to that track prevents the mark from being read. For example, when reading the mark recorded in the $11^{th}$ sector Sct11 in FIG. 1, cross talk occurs due to the mark in the first sector Sct1 or the mark in the $21^{st}$ sector Sct21.

Figure 2:
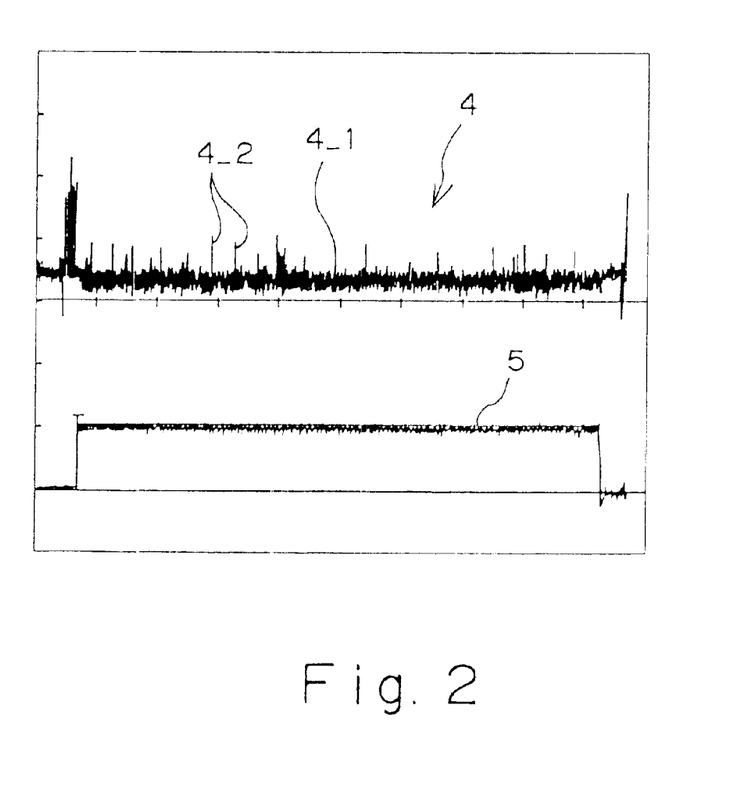
FIG. 2 is a graph showing an example of cross talk.

FIG. 2 is a graph showing an example of cross talk.

The upper part in FIG. 2 shows a signal waveform 4 of a read signal obtained when performing reading with respect to an erased sector having no mark therein. A mark is written on a sector adjacent to the erased sector in a transverse direction of the tracks.

Further, the lower part of the FIG. 2 graph shows a waveform 5 of a gate signal indicative of a significant part in the read signal. In the signal waveform 4 of the read signal shown in the upper part of the graph, only a portion corresponding to a time interval during which the waveform 5 of the gate signal shown in the lower part rises is a significant signal waveform.

A flat waveform 4_1 and a spike-like waveform 4_2 exist in the signal waveform 4 of the read signal, and the flat waveform 4_1 is indicative of a signal caused due to an erased sector and the spike-like waveform 4_2 is indicative of cross talk owing to a sector on an adjacent track. The signal intensity of such cross talk may be strong such that the signal is hardly differentiated from an original read signal. In such a case, a mark is prevented from being read.

In the prior art defective region processing apparatus or defective region processing method, the above-described cross talk caused due to a defective sector keeps preventing a mark in a sector adjacent to the defective sector in the transverse direction of the tracks from being read even after a process for prohibiting use of the defective sector or a process for registering a normal preliminary sector instead of the defective sector is executed.

Although the above problem becomes prominent in an optical disk device adopting the land and groove recording, this problem occurs not only in such a device but it can be generally observed in an information storage device having the narrow track pitch.

SUMMARY OF THE INVENTION

In view of the above-described drawback, an object of the present invention is to provide a defective sector processing apparatus and a defective sector processing method capable of processing a defective sector so that a mark in a sector adjacent to the defective sector can be normally read, and an information storage device provided with a function as such a defective sector processing apparatus.

Since a mark can be normally read even though miniaturization of the track pitch is attained when the present invention is used, realization of high density of the information storage medium can greatly proceed.

To this end, a defective region processing apparatus according to the present invention comprises:

a mark writing section writing a mark onto an information storage medium which has a recording area divided into a plurality of regions, on which information is recorded by writing a mark in a region, and from which information is reproduced by reading the recorded mark;

a judging section making judgment upon whether a region having a mark written therein by the mark writing section is a normal region or a defective region; and a recording state changing section changing a recording state of a mark in a region determined as a defective region by the judging section so that cross talk caused due to that region can be reduced.

The term "region" used herein may be a generally called sector, a block consisting of a plurality of sectors, or multiple divided sectors.

In addition, the recording state changing section may change the recording state by using the mark writing section or may change the recording state by using means independent from the mark writing section.

Moreover, the defective region processing apparatus according to the present invention may be incorporated in an information storage device for recording information on an information storage medium or may be incorporated in a formatting device for formatting an information storage medium.

According to the defective region processing apparatus of the present invention, since the recording state of a defective region is changed so that cross talk due to that region can be reduced, a mark in a region adjacent to the defective region can be normally read.

The defective region processing apparatus according to the present invention, it is preferable that the recording state changing section erases a mark written in a region determined as a defective region by the judging section.

Erasing a mark in the defective region can readily reduce cross talk.

According to the defective region processing apparatus of the present invention, it is preferable that the recording state changing section overwrites a mark generating lower cross talk than cross talk due to a mark written in a region determined as a defective region by the judging section in that region.

Here, "a mark generating lower cross talk" may be a mark having a shorter length than an existing mark or may be a mark having a narrower width than an existing mark.

In order to reproduce information from an information storage medium, a plurality of regions including a defective region may be required to be sequentially scanned. In such a case, if a mark exists in that defective region, the stable scanning is enabled for the later-described reason.

It is to be noted that the mark having a narrower width than an existing mark can be easily realized by writing a mark with weaker power than the power used for writing an existing mark.

A defective region processing method according to the present invention for achieving the above-described object comprises:

mark writing step of a mark into a region on an information storage medium which has a recording area divided into a plurality of regions, on which information is recorded by writing a mark in the region, and from which information is reproduced by reading a recorded mark;

judging step of making judgment upon whether a region having a mark written therein by the mark writing step is a normal region or a defective region; and recording state changing step of changing a recording state of a mark in a region determined as a defective region by the judging step so that cross talk caused due to that region can be reduced.

Furthermore, to achieve the above-described object, an information storage device according to the present invention for recording information onto an information storage medium which has a recording area divided into a plurality of regions, on which information is recorded by writing a mark in the region and from which information is reproduced by reading the recorded mark, comprises:

a mark writing section writing a mark onto the information storage medium;

a judging section making judgment upon whether a region having a mark written therein by the mark writing section is a normal region or a defective region; and a recording state changing section changing a recording state of a mark in a region determined as a defective region by the judging section so that cross talk due to that region can be reduced.

Generally, in the information storage device, when recording of information is failed even though trial run of recording information with respect to a given region is repeated for a predetermined number of times, that region is determined as defective. When recording of information is failed in this manner, it is often the case that a mark indicative of incomplete information is written in that region, and cross talk caused due to such a mark is hardly differentiated from the original information. Reduction in cross talk according to the present invention is particularly effective.

Although only basic modes of the defective region processing method and the information storage device according to the present invention are disclosed herein in order to simply avoid tautological explanation, the defective region processing method and the information storage device include various types of defective region processing method and information storage device associated with each mode of the above-described defective region processing apparatus as well as the base modes of the defective region processing method and the information storage device.

DETAILED DESCRIPTION OF THE PREFERRED EMBODIMENT

An embodiment according to the present invention will now be described hereinafter.

Figure 3:
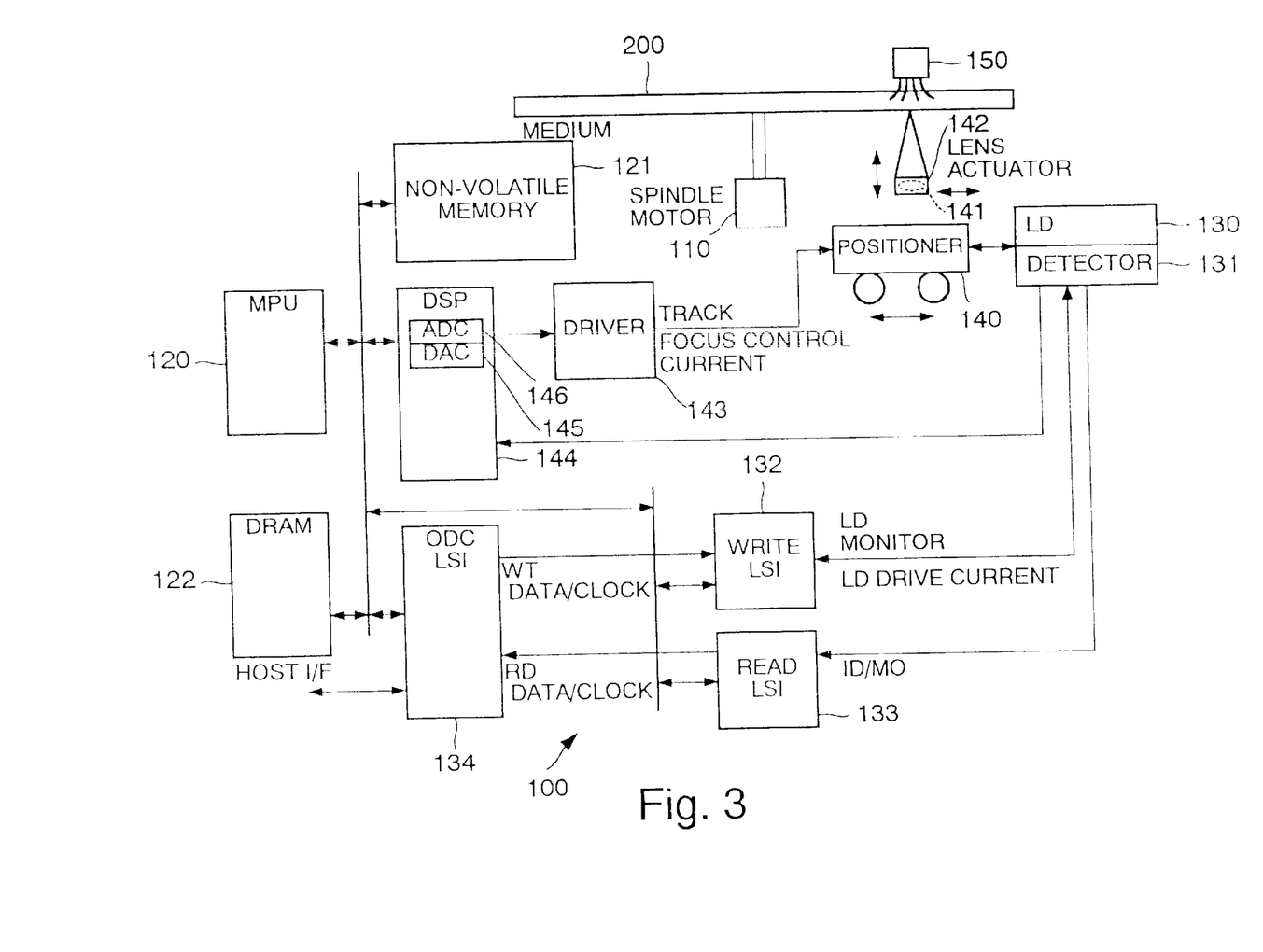
FIG. 3 is a view showing an embodiment of an information storage device according to the present invention.

FIG. 3 is a view showing an embodiment of an information storage device according to the present invention.

A function as an embodiment of a defective region processing apparatus according to the present invention is incorporated in the information storage device depicted in FIG. 3 and performs processing based on an embodiment of a defective region processing method according to the present invention.

This information storage device 100 is a so-called MO disk device using a magnetic optical (MO) disk as an information storage medium 200. A recording area of the information storage medium 200 is divided into such sectors as shown in FIG. 1. These sectors are an example of regions in the present invention.

The information storage medium 200 is held by a spindle motor 110. Revolution drive of the spindle motor 110 is controlled by an MPU (Micro Processor Unit) 120. The MPU 120 operates as a judging section in the present invention in accordance with a program stored in a non-volatile memory 121 and utilizes a DRAM 122 as a working area.

Further, the information storage device 100 is provided with a laser diode unit 130 and a laser beam having a predetermined intensity is emitted from the laser diode unit 130 during reproduction of information. The intensity of the laser beam is monitored by a monitor photodetector included in a detector group 131 and controlled by a write circuit 132 based on a monitor signal obtained by the monitor photodetector. The laser beam is incident upon the information storage medium 200 by an object lens 141 mounted on a positioner 140, thereby generating a reflected light ray associated with information recorded on the information storage medium 200. The reflected light ray is accepted by an ID/MO detector included in the detector group 131 to detect an ID signal and an MO signal. The ID signal and the MO signal are inputted into a read circuit 133 to be converted into reproduction data and a clock signal for data analysis. The reproduction data is fed to an interface of a host device such as a computer through an optical disk controller 134.

On the other hand, at the time of recording information, recording data is supplied from the interface of a host device through the optical disk controller 134 and inputted together with a clock signal for writing data into the write circuit 132. In initialization (formatting) of the information storage medium 200, formatted data is generated by the optical disk controller 134 to be inputted together with the clock signal for writing data into the write circuit 132. The write circuit 132 is controlled by the MPU 120 via a bus and operates in synchronism with the clock signal for writing data. Additionally, the write circuit 132 modulates the recording data and the formatted data to be converted into a laser diode drive current. The laser diode drive current is inputted into a laser diode unit 130 where a laser beam is emitted. The read circuit 133 also works during recording information and formatting, and the reproduction data obtained by the read circuit 133 is supplied to the MPU 120 to be used for judgment upon normal/defective sectors. That is, the MPU 120 corresponds to an example of a judging section in the present invention.

In recording information and formatting, an electric current is supplied to an electromagnet 150 so that a recording magnetic field is generated on the information storage medium 200. Information is recorded on the information storage medium 200 or the information storage medium 200 is formatted by the recording magnetic field and heat of the laser beam associated with the above-described write signal. In other words, an example of the mark writing section in the present invention is constituted by the electromagnet 150, the laser diode 130, the object lens 141 and others. In addition, an example of the mark writing section configured as described above and the MPU 120 constitute an example of the recording state changing section according to the present invention.

Further, the information storage device 100 is provided with a lens actuator 142 for driving the object lens 141, and the above-mentioned positioner 140 having the object lens 141 and a lens actuator 142 mounted thereon moves along the surface of the information storage medium 200. A track focus control current is supplied to the positioner 140 and the lens actuator 142 by a driver 143 so that these members are controlled. The driver 143 outputs a track focus control current associated with a control signal inputted from a DSP (Digital Signal Processor) 144 via a D/A conversion circuit 145. The DSP 144 fetches and analyzes a tracking error signal (TES) and a focus error signal (FES) obtained by the detector group 131 and inputs a control signal based on a result of analysis to the driver 143.

A program representing the operation of the DSP 144 is also stored in the non-volatile memory 121, and the DRAM 122 is also used as a working space of the DSP 144.

The operation of such an information storage device 100 will now be described hereinafter with reference to a flowchart.

Figure 4:
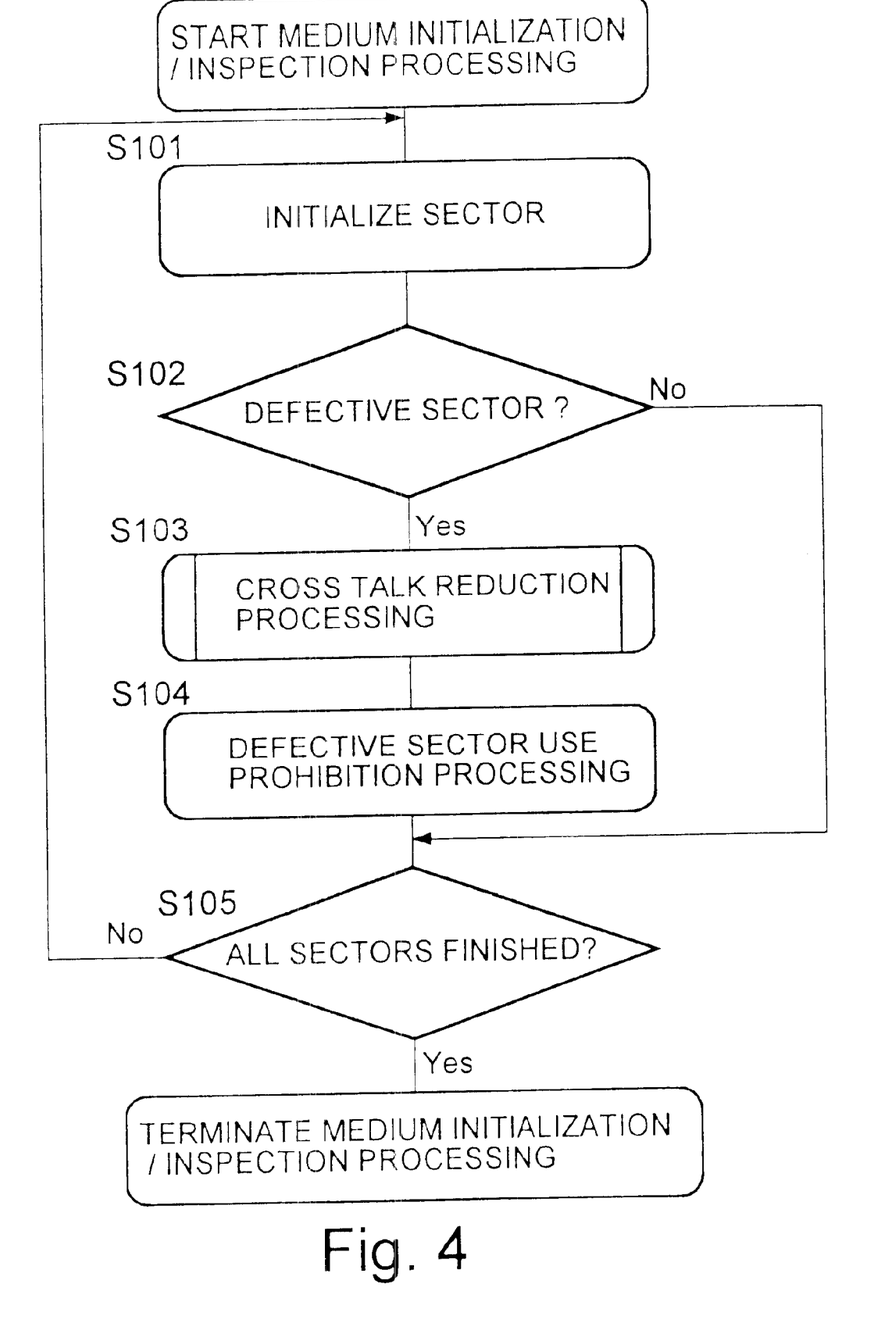
FIG. 4 is a flowchart of medium initialization/inspection processing.

FIG. 4 is a flowchart of medium initialization/inspection processing.

The information storage device 100 shown in FIG. 3 executes in accordance with an instruction from a user the medium initialization/inspection processing for inspecting each sector on the information storage medium 200 while initializing (formatting) the information storage medium 200.

Upon starting the medium initialization/inspection processing, one sector is first initialized (step S101), and inspection is performed to confirm whether that sector is a defective sector (step S102). This inspection is effected by a general technique for writing a mark in a sector as a test to confirm whether that mark is abnormal or normal. When it is determined that the sector is a defective sector as a result of inspection, a later-described cross talk reduction process for reducing cross talk due to the defective sector is executed (step S103) and a process for prohibiting use of that defective sector is performed (step S104).

When initialization of all the sectors of the information storage medium is uncompleted (step S105: No), these steps S101 to S104 are repeatedly executed, and the medium initialization/inspection process is terminated upon completion of initialization of all the sectors (step S105: Yes).

As a cross talk reduction process executed in the step S103, such a process as described below can be considered.

An erasing process for erasing a mark written in a defective sector can be considered as a first example of the cross talk reduction process. This erasing process is a simple process and can assuredly reduce cross talk since a mark itself which can cause cross talk is erased.

As a second example of the cross talk reduction process, there can be considered an overwriting process for overwriting a mark which generates cross talk whose level is lower than that of the counterpart produced by a mark written in a defective sector in that defective sector. As a mark overwritten in the defective sector by this overwriting process, a mark having a smaller length or width than that of the mark written in the defective mark may be used for example. A length of the mark can be adjusted by a light emitting time of the laser diode 130 shown in FIG. 3, and a width of the mark can be adjusted by laser power of the laser diode 130.

Figure 5:
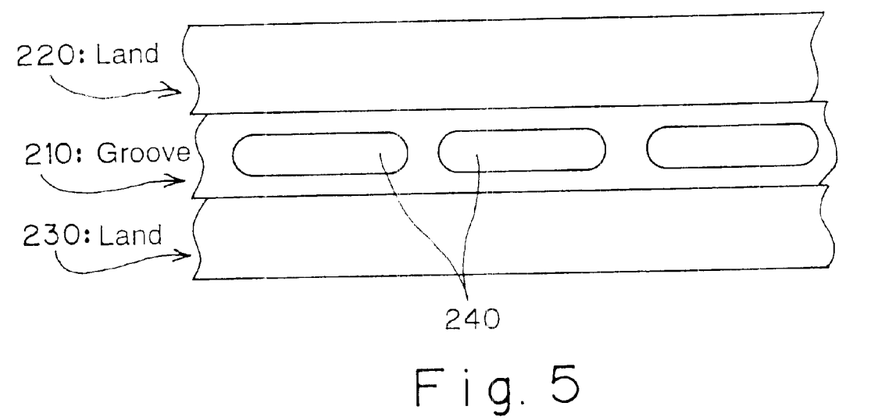
FIG. 5 is a view showing marks having a long mark length.
Figure 6:
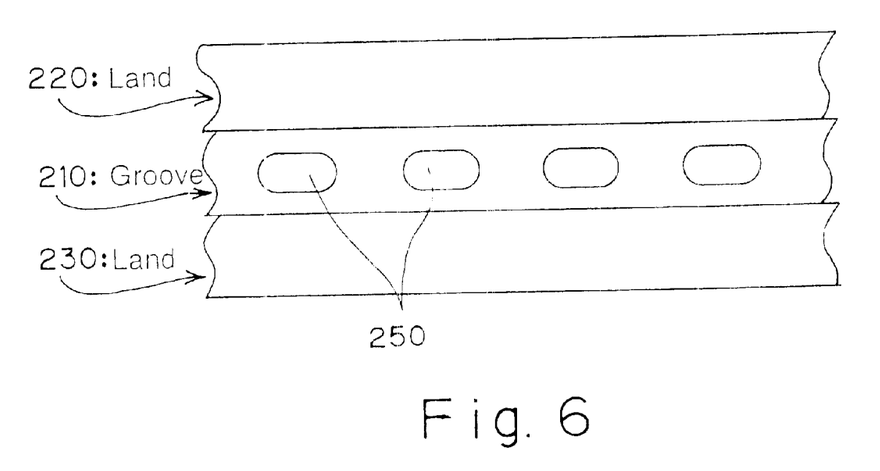
FIG. 6 is a view showing marks having a short mark length.

FIG. 5 is a view showing marks having a long mark length, and FIG. 6 is a view showing marks having a short mark length.

FIGS. 5 and 6 show one groove 210, and two lands 220 and 230 sandwiching the groove 210, marks 240 and 250 being written on the groove 210. Here, a maximum value and a minimum value are determined for the length of the mark recorded on the information storage medium. The mark 240 shown in FIG. 5 is a mark having a long mark length close to the maximum value of the mark length, and the mark 250 illustrated in FIG. 6 is a mark having a short mark length close to the minimum value of the mark length. The mark 250 having a short mark length such as shown in FIG. 6 generates cross talk whose level is lower than that of cross talk produced by the mark 240 having a long mark length such as shown in FIG. 5.

Therefore, by overwriting the mark having the shorter mark length than the mark written in the defective sector in that defective sector, cross talk can be reduced.

Figure 7:
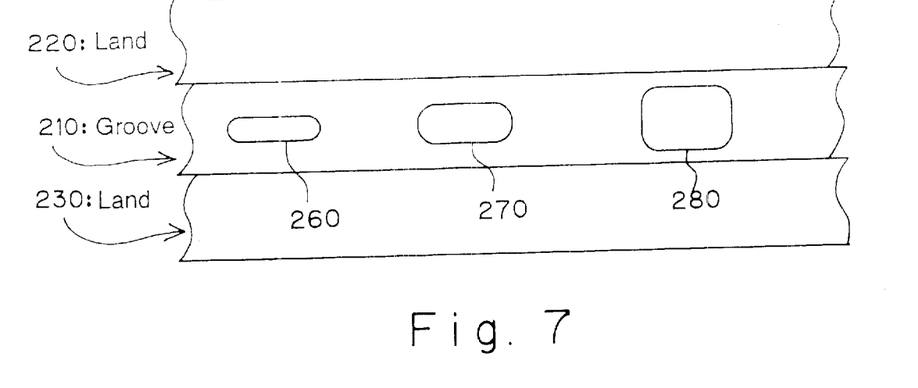
FIG. 7 is a view showing marks having different mark lengths.

FIG. 7 is a view showing marks having different mark widths.

As similar to FIG. 5 or 6, FIG. 7 shows one groove 210 and two lands 220 and 230 sandwiching the groove 210. Here, three marks 260, 270 and 280 having different mark widths are also shown on the groove 210. In regard to the laser power used when the three marks 260, 270 and 280 are respectively written, the laser power used when the mark 260 having the narrowest mark width is written is weakest, whereas the laser power used when the mark 280 having the widest mark width is written is strongest. Additionally, as to the level of cross talk due to each of the three marks 260, 270 and 280, the level of cross talk due to the mark 260 having the narrowest mark width is lowest, whereas the level of cross talk due to the mark 280 having the widest mark width is highest.

Therefore, cross talk can be reduced by overwriting the mark having the narrower mark width than that of the mark written in the defective sector in that defective sector. Such a mark having the narrow mark width can be realized by overwriting the mark by using power weaker than that used when writing the mark in the defective sector.

Figure 8:
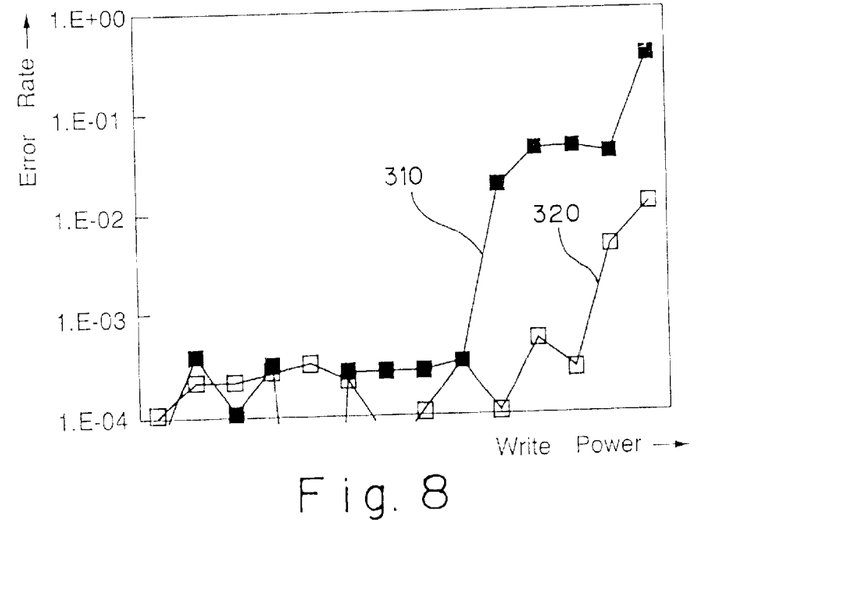
FIG. 8 is a graph illustrating an advantage of a second example of cross talk reduction processing.

FIG. 8 is a graph illustrating the advantage of the second example of the cross talk reduction process.

The horizontal axis of this graph represents power used when the mark is written, and the vertical axis of the same indicates an error rate of the read error generated when reading a mark in a sector adjacent to a sector in which the mark is written. Further, a line chart 310 with black squares represents measurement results relative to the long mark 240 shown in FIG. 5, and a line chart 320 with outline squares represents measurement results relative to the short mark illustrated in FIG. 6.

An allowable level of the error rate is typically approximately $10^{-3}$, and both the error rate indicated by the line chart 310 with black squares and the error rate indicated by the line chart 320 with outline squares become equal to or far below the allowable level when the power is low to some extent. Accordingly, by overwriting a mark in the defective sector with the power which is low to some extent, normal mark reading is assured in a sector adjacent to the defective sector.

Moreover, the upper limit of the power range indicating the error rate obtained when the line chart 320 with outline squares is not more than the allowable level exceeds the upper limit of the power range indicating the error rate obtained when the line chart 310 with the black squares is not more than the allowable level. Therefore, even if the power used for writing the mark is strong, overwriting a short mark in the defective sector can assure normal mark reading in a sector adjacent to the defective sector.

Description will now be given as to merits of the overwriting processing countervailing the erasing processing.

If a sector other than a defective sector is normal even though a track includes the defective sector, tracking is performed with respect to that track to effect mark reading relative to the normal sector.

Figure 9:
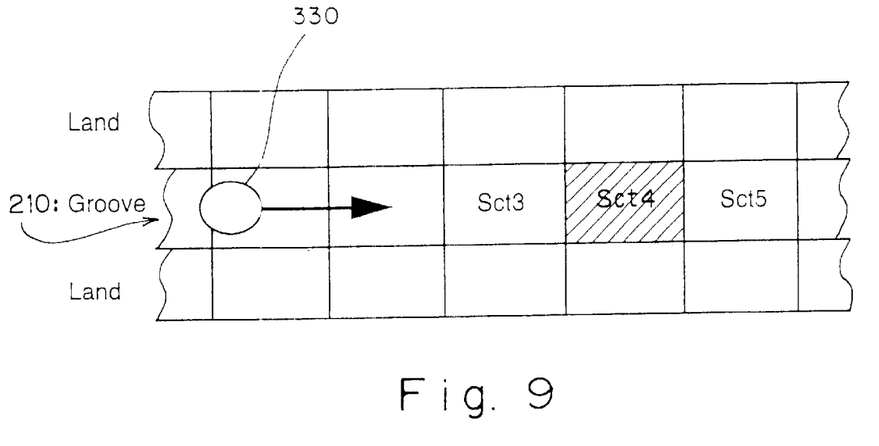
FIG. 9 is a view showing the state that tracking is effected with respect to a track on which a defective sector exists.

FIG. 9 is a view showing the state in which tracking is carried out with respect to a track having a defective sector.

Here, the fourth sector Sct4 on the groove 210 is a defective sector, and the groove 210 is a target of tracking.

A spot 330 of the laser beam sequentially passes the third sector Sct3, the fourth sector Sct4 and the fifth sector Sct5 while going over the groove 210 so that mark reading is carried out with respect to the third sector Sct3 and the fifth sector Sct5.

Figure 10:
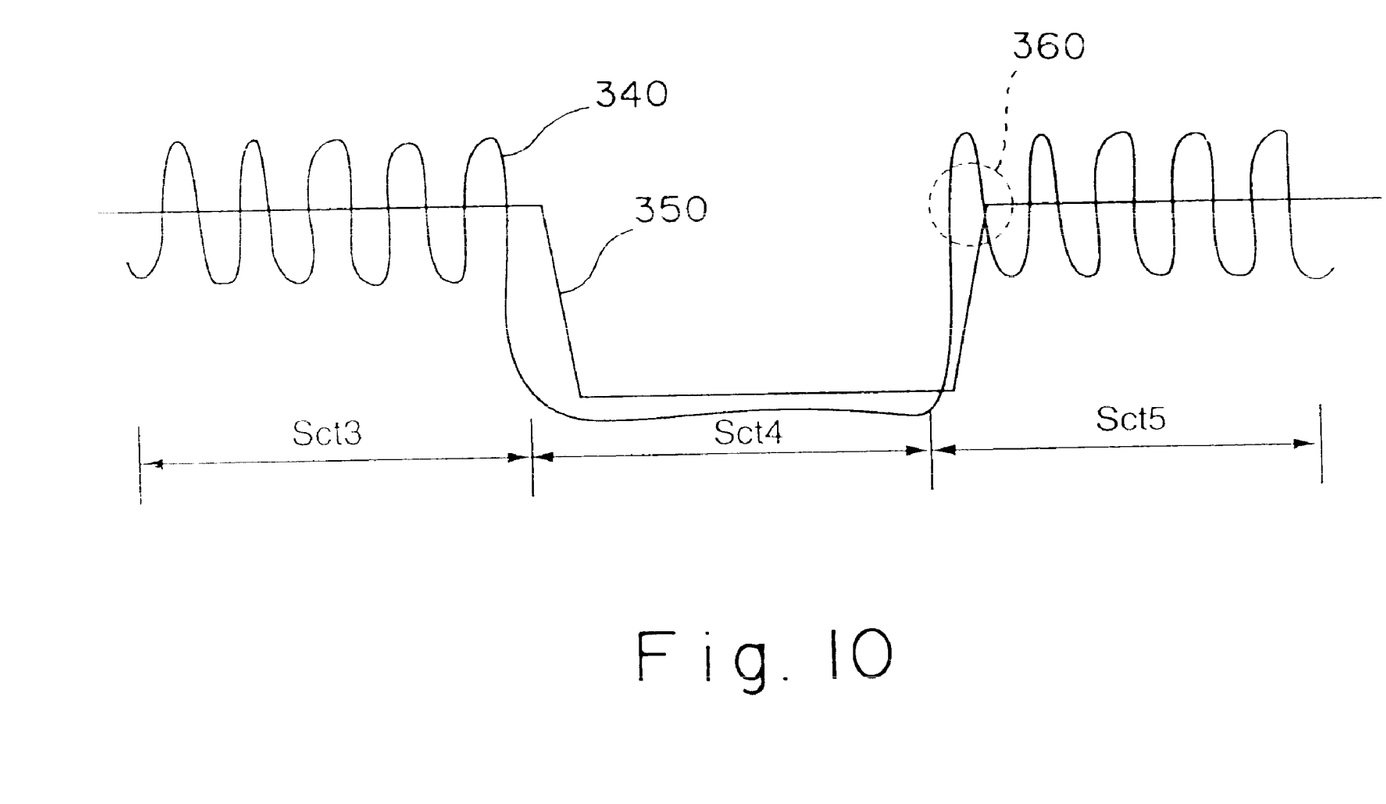
FIG. 10 is a type drawing showing a read signal in front and back of a defective sector.

FIG. 10 is a type drawing showing a read signal in front and back of a defective sector.

Here, a read signal 340 obtained when the erasing processing was executed to the defective sector is shown, and the level of the read signal 340 extremely varies between the fourth sector Sct4 as the defective sector and the third and fifth sectors Sct3 and Sct5 as normal sectors.

In case of tracking, a slice level for decoding the read signal 340 varies along with the level of the read signal 340. When tracking on the fourth sector Sct4, the slice level 350 becomes extremely low. Therefore, the slice level 350 can not follow changes in the read signal 340 at a forefront part 360 of the fifth sector Sct5, and hence the possibility of occurrence of a read error is high.

In order to avoid such a phenomenon, the overwriting processing by which the mark is also written in the defective sector is preferable.

Applying the above-described cross talk reduction processing to the defective sector can enable normal mark reading to be effected in a sector adjacent to the defective sector.

Another operation of the above-mentioned information storage device 100 will now be described hereunder.

Figure 11:
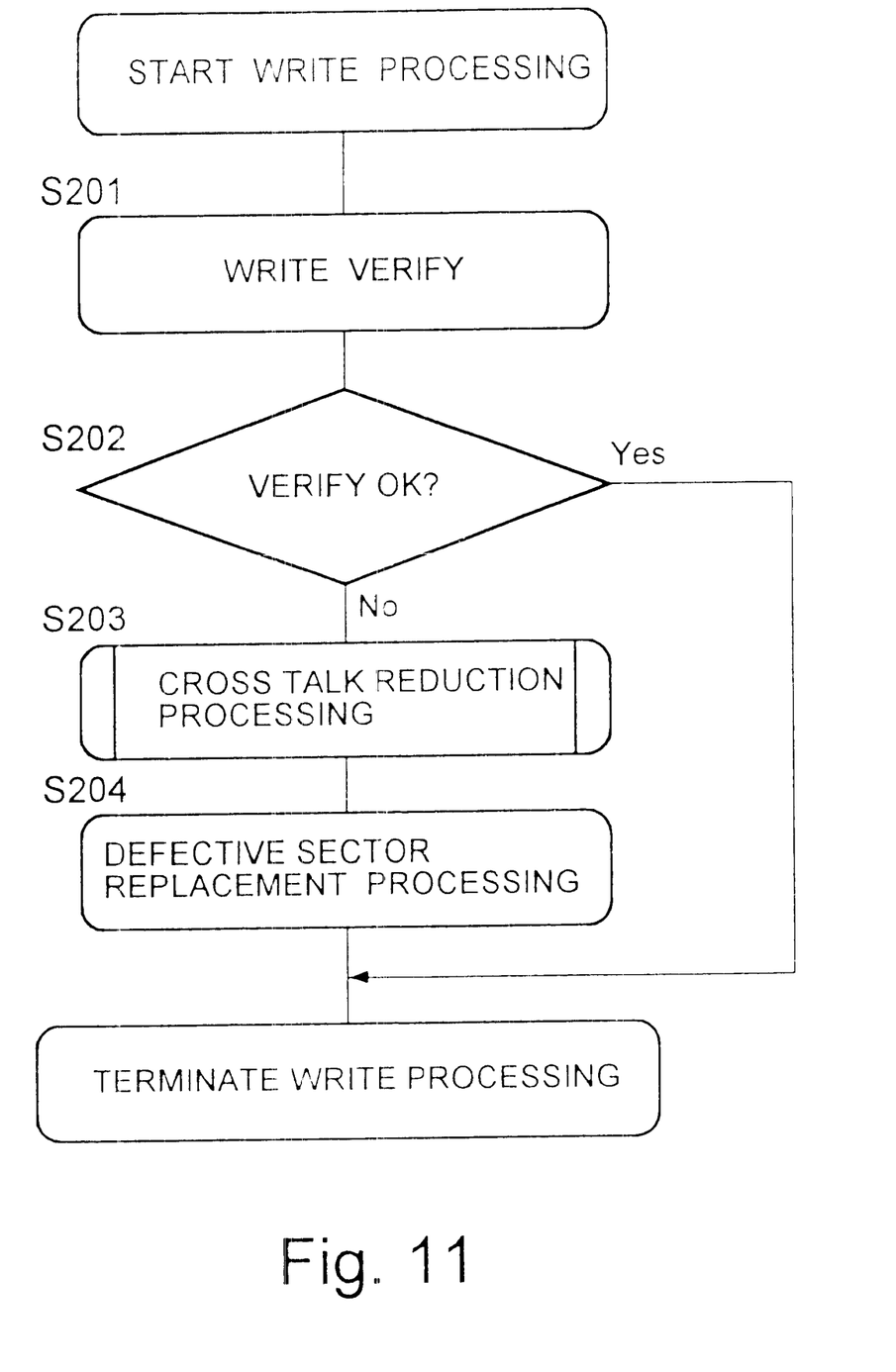
FIG. 11 is a flowchart showing write processing.

FIG. 11 is a flowchart of write processing.

The information storage device 100 executes the write processing for writing a mark on the information storage medium in accordance with an instruction from a user.

Upon starting the write processing, a mark associated with record data supplied from a host device is written in a sector on the information storage medium, and write verification for confirming that the written mark is correct is carried out (step S201).

If a result of write verification is normal (step S202: Yes), the write processing is terminated as it is. On the other hand, if a result of write verification is abnormal (step S202: No), the sector in which the mark is written is determined as a defective sector, and the above-described cross talk reduction processing is executed with respect to the defective sector (step S203). Further, replacing processing for replacing the defective sector with a preliminary sector is performed (step S204) to terminate the write processing.

With such write processing, a mark which has been incompletely written in a defective sector which can be found by failure of writing a mark is erased or overwritten by the cross talk reduction processing. Since the incompletely written mark generates cross talk which is hardly differentiated from an original read signal, reduction in cross talk by the cross talk reduction processing is effective.

Figure 12:
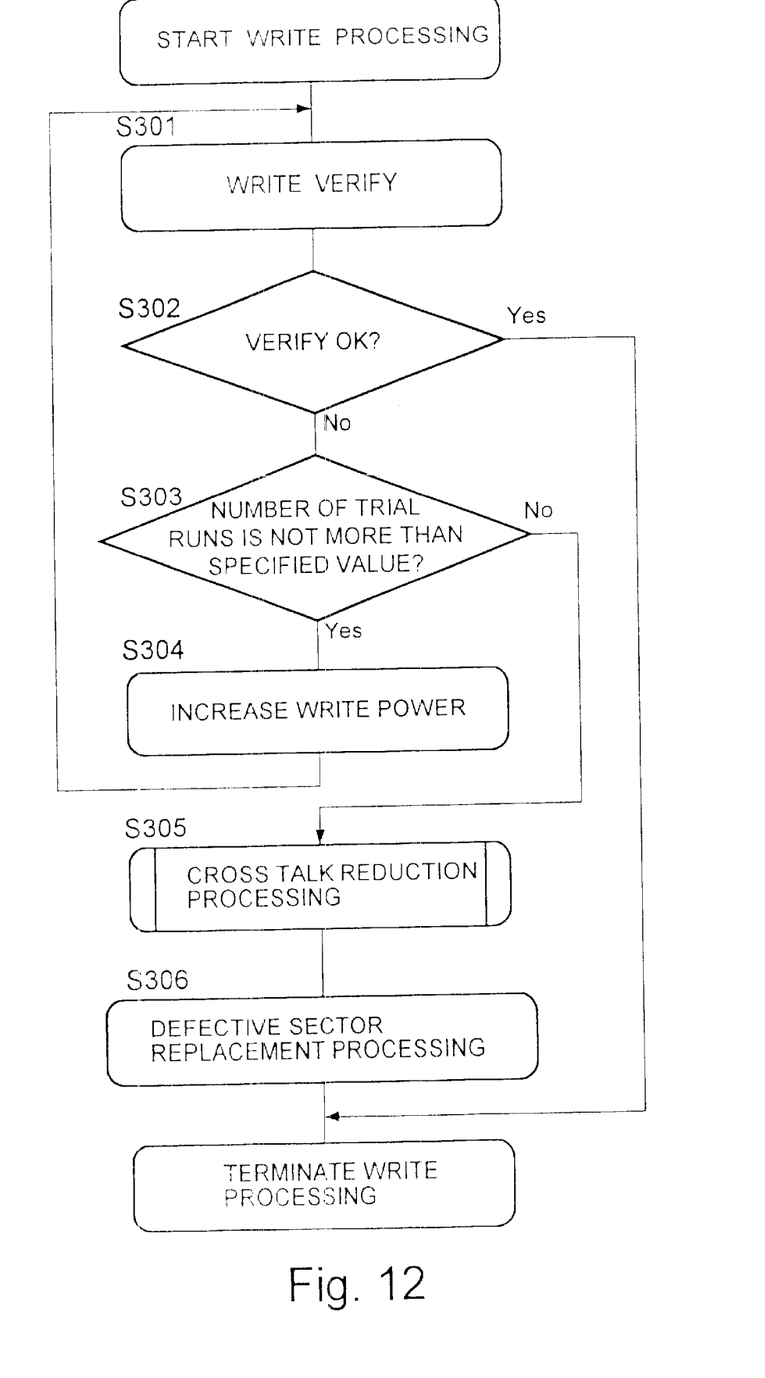
FIG. 12 is a flowchart showing another write processing.

FIG. 12 is a flowchart of different write processing.

As similar to the write processing shown in FIG. 11, the write processing shown in FIG. 12 executes writing a mark associated with the record data into a sector and write verification of that mark (step S301). If a result of write verification is normal (step S302: Yes), the write processing is terminated.

If a result of write verification is abnormal (step S302: No), the power for writing a mark is increased (step S304) within such a limit as that a number of trial runs of writing a mark is not more than a specified value (step S303: Yes), and control returns to the step S301.

When a number of trial runs exceeds a specified value, that sector is determined as a defective sector, and the cross talk reduction processing (step S305) and the replacing processing (step S306) are executed as described above, thereby terminating the write processing.

In the write processing shown in FIG. 12, the power for writing a mark is repeatedly increased to perform trial runs for writing a mark until the sector is determined as a defective sector. Therefore, since an incomplete mark which generates strong cross talk is written in the defective sector, reduction in cross talk by the cross talk reduction processing is extremely effective.

Although the laser power for writing a mark is illustrated in the above embodiment, the power according to the present invention may be an intensity of a magnetic field.

An optical recording type magnetic optical disk is used as an information storage medium in the above embodiment, but the information storage medium used in the present invention may be a magnetic optical disk adopting each recording mode such as magneto optical recording, phase change recording and magnetic recording, or any other disk type storage medium such as an optical disk or a magnetic disk, or a card or tape type storage medium.

Further, the region in the present invention may be a sector exemplified in the foregoing embodiment, or a block consisting of a plurality of sectors, or a sector divided into plural parts.

Moreover, in the above embodiment, the electromagnet or the laser diode constitutes the mark writing section and is also used as a part of the recording state changing section. However, the recording state changing section in the present invention may be provided with means for erasing a mark or means for rewriting a mark independently from the mark writing section.

As described above, according to the present invention, a mark can be normally read in a sector adjacent to a defective sector. Therefore, utilizing the present invention enables a mark to be normally read even if a track pitch is miniaturized, and realization of high density of an information storage medium can thereby greatly advance.

What is claimed is:

1. A defective region processing apparatus comprising:
    a mark writing section writing a mark onto an information storage medium, said information storage medium having a recording area divided into a plurality of regions, information being recorded by writing a mark in said region and reproduced by reading said mark;
    a judging section making judgment upon whether a region in which a mark is written by said mark writing section is a normal region or a defective region; and
    a recording state changing section changing a recording state of a mark in a region determined as a defective region by said judging section so that cross talk caused due to said region can be reduced.

2. The defective region processing apparatus according to claim 1, wherein said recording state changing section erases a mark written in a region determined as a defective region by said judging section.

3. The defective region processing apparatus according to claim 1, wherein said recording state changing section overwrites a mark which generates cross talk lower than cross talk caused due to a mark written in a region determined as a defective region by said judging section in said region.

4. The defective region processing apparatus according to claim 1, wherein said recording state changing section overwrites a mark having a length shorter than that of a mark written in a region determined as a defective region by said judging section in said region.

5. The defective region processing apparatus according to claim 1, wherein said recording state changing section overwrites a mark having a width narrower than that of a mark written in a region determined as a defective region by said judging section in said region.

6. The defective region processing apparatus according to claim 5, wherein said recording state changing section overwrites a mark with power weaker than power used when writing a mark in a region determined as a defective region by said judging section in said region.

7. A defective region processing method comprising:
    mark writing step of writing a mark in a region on an information storage medium, said information storage medium having a recording area divided into a plurality of regions, information being recorded by writing a mark in said region and reproduced by reading said mark;
    judging step of making judgment upon whether a region in which a mark is written by said mark writing step is a normal region or a defective region; and
    recording state changing step of changing a recording state of a mark in a region determined as a defective region by said judging step so that cross talk caused due to said region can be reduced.

8. The defective region processing method according to claim 7, wherein said recording state changing step erases a mark written in a region determined as a defective region by said judging step.

9. The defective region processing method according to claim 7, wherein said recording state changing step overwrites a mark which generates cross talk lower than cross talk caused due to a mark written in a region determined as a defective region by said judging step in said region.

10. The defective region processing method according to claim 7, wherein said recording state changing step overwrites a mark having a length shorter than that of a mark written in a region determined as a defective region by said judging step in said region.

11. The defective region processing method according to claim 7, wherein the recording state changing step overwrites a mark having a width narrower than that of a mark written in a region determined as a defective region by said judging step in said region.

12. The defective region processing method according to claim 11, wherein the recording state changing step overwrites a mark with power weaker than power used when writing a mark in a region determined as a defective region by said judging step in said region.

13. An information storage device for recording information onto an information storage medium which has a recording area divided into a plurality of regions, on which information is recorded by writing a mark in said region and from which information is reproduced by reading said mark, said information storage device comprising:

a mark writing section writing said mark on said information storage medium;

a judging section making judgment upon whether a region in which a mark is written by said mark writing section is a normal region or a defective region; and a recording state changing section changing a recording state of a mark in a region determined as a defective region by said judging section so that cross talk caused due to said region can be reduced.

14. The information storage device according to claim 13, wherein said recording state changing section erases a mark written in a region determined as a defective region by said judging section.

15. The information storage device according to claim 13, wherein said recording state changing section overwrites a mark which generates cross talk lower than cross talk caused due to a mark written in a region determined as a defective region by said judging section in said region.

16. The information storage device according to claim 13, wherein said recording state changing section overwrites a mark having a length shorter than that of a mark written in a region determined as a defective region by said judging section in said region.

17. The information storage device according to claim 13, wherein said recording state changing section overwrites a mark having a width narrower than that of a mark written in a region determined as a defective region by said judging section in said region.

18. The information storage device according to claim 17, wherein said recording state changing section overwrites a mark with power weaker than power used when writing a mark in a region determined as a defective region by said judging section in said region.

* * * * *